June 14, 1960 G. D. WILD 2,940,634
EATING AID
Filed June 2, 1958

INVENTOR.
GORDON D. WILD
BY
Beehler & Shanahan
ATTORNEYS.

United States Patent Office 2,940,634
Patented June 14, 1960

2,940,634

EATING AID

Gordon D. Wild, Rte. 1, Box 36E, Little Rock, Calif.

Filed June 2, 1958, Ser. No. 739,349

1 Claim. (Cl. 220—85)

The invention relates to eating aids and concerns particularly an attachment for a plate, saucer, or dish which, when in place, will provide a baffle against which food on the plate may be pushed to facilitate placing the food upon a fork or spoon preparatory to eating.

There are various occasions when either because of the kind or variety of food being consumed a person making use of the food may be unable to effectively get the fork or spoon beneath the food. While it is readily understood that small children habitually need to use the thumb or fingers of the other hand while eating, it should also be appreciated that there are mature persons who, because perhaps of the loss or paralysis of one arm or for other physical reasons, do not have complete control over their digital members and under such circumstances employment of a food baffle serving as an eating aid on the plate would be of very material value.

It is therefore among the objects of the invention to provide a new and improved eating aid for use on a plate, platter, saucer, or similar vessel, which is extremely simple in its structure to the end that it may be easily applied and removed and which is thoroughly sanitary in all respects.

Another object of the invention is to provide a new and improved eating aid which is light, small and inexpensive and which at the same time is inconspicuous to the extent that it can be readily used with a maximum of freedom of embarrassment by persons who might find use of such an eating aid necessary or desirable.

Still another object of the invention is to provide a new and improved inexpensive and inconspicuous sanitary eating aid in the form of a baffle for use on plates, saucers, and platters, which is so formed that it is adaptable with equal ease to the various plate-like objects regardless of size or wall configuration.

Still another object of the invention is to provide a new and improved table set which by combining a removable baffle with a plate is of material assistance in holding food upon the plate so that it can be easily manipulated by use of a fork or spoon held in one hand by the user.

With these and other objects in view, the invention consists in the construction, arrangement and combination of the various parts of the device whereby the objects contemplated are attained, as hereinafter set forth, pointed out in the appended claim and illustrated in the accompanying drawings.

Figure 1:
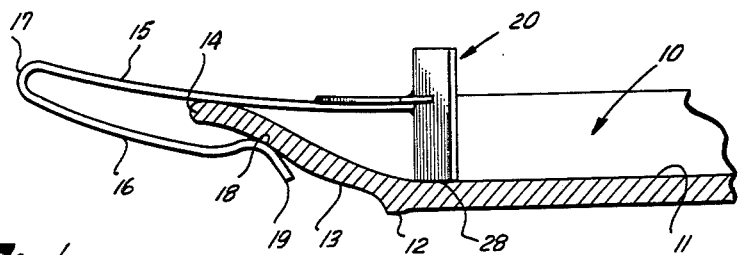
Figure 1 is a fragmentary vertical sectional view of a plate showing a removable eating aid mounted thereon in a position ready for use.

In the embodiment of the invention chosen for the purpose of illustration there is shown a fragment of a conventional plate 10 which has a flat bottom 11 surrounded of the exterior thereof by a bead 12. Around the perimeter of the bottom is a wall 13 which extends outwardly and upwardly terminating in a rim 14 at the outermost perimeter. Although plates vary in shape and size in that in some the walls may form a deep bowl and in others may form a relatively shallow depression, the configuration in general is sufficiently similar to provide a generally flat outwardly extending wall and rim combination to which the food retainer may be attached.

The food retainer identified herein as an eating aid comprises an upper strip portion 15 and a lower strip portion 16 positioned one above the other and in roughly parallel relationship. The strips comprise essentially a single piece of flat strip stock preferably of one of the currently available commercial synthetic plastic resinous materials which is of such nature as to afford a resilient character. Outer ends of the upper and lower strip portions are connected together by an intermediate portion which has the same or a greater degree of resilient consistency such that the intermediate portion will tend to hold the upper and lower strip portions resiliently together.

Figure 2:
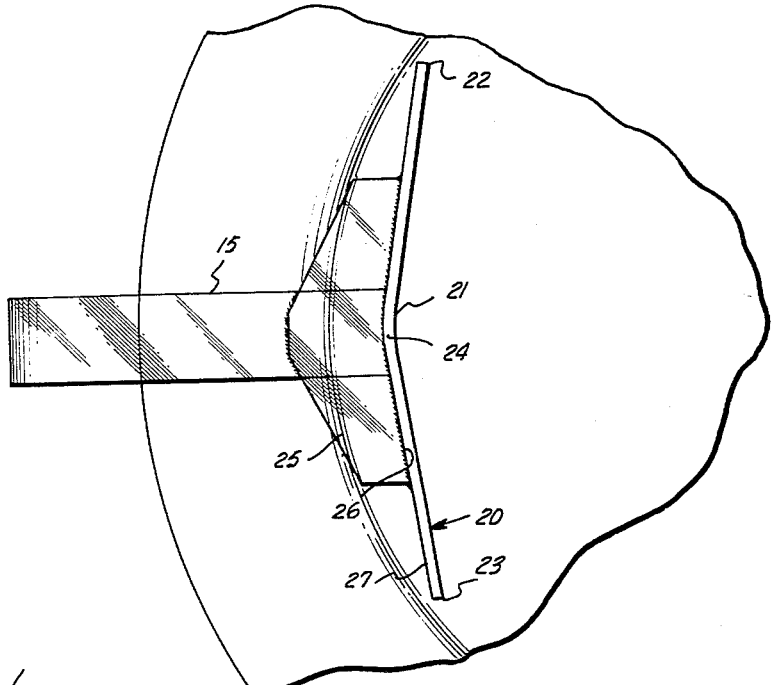
Figure 2 is a fragmentary plan view of a plate showing the eating aid mounted thereon in the same relative position as in Figure 1.

The lower strip portion which is the shorter of the two is provided as shown with an inner rounded end 18, the convex or rounded portion of which is in a position to bear against the underside of the wall 13 of the plate when in the operative position shown in Figures 1 and 2 and which when released therefrom will be spring-pressed upwardly against the underside of the upper strip portion. A free end 19 extends downwardly to provide a sloping or camming surface whereby to facilitate spreading of the strip portions apart when the eating aid is to be clipped upon the edge of the plate 10.

The upper strip portion 15, longer than the lower strip portion, extends well beyond the free end 19 to a location which when clipped in operating position is sufficient to overlie the flat bottom 11. Attached to the innermost end of the upper strip portion is a baffle 20 of the same synthetic plastic material which is so positioned that it stands substantially vertical with respect to the flat bottom 11. The baffle is so formed that it presents a hollow vertical depression 21 intermediate opposite ends 22 and 23. The baffle is joined to the upper strip portion at its innermost end 24 which is cut to receive the baffle. The attachment may be made by fusing or welding the material of the baffle to the material of the upper strip portion 15.

In order to supply sufficient strength and bracing to the connection there is provided a bracket 25, an edge 26 of which is welded to a reverse face 27 of the baffle. The upper portion of the bracket lies face to face with the upper surface of the upper strip portion 15 to which it is attached by some appropriate adhesive or welding operation.

In use the eating aid is clipped over the rim 14 and wall 13 by pressing the free end 19 and rounded end 18 against the underside of the rim 14 and pushing the clip-like handle far enough toward the center of the plate to enable a lower edge 28 of the baffle to rest evenly upon the flat portion of the bottom 11 of the plate. In this position the inner rounded end 18 of the lower strip portion will bear against the underside of the wall 13 with a certain amount of friction resistance under pressure of the resiliency of the intermediate portion 17 sufficient to hold the baffle firmly in place. Thus mounted food can be moved against the face of the baffle which being depressed will greatly facilitate the gathering of food at the mid-portion where a fork or spoon can be pushed under it.

Employment of the eating aid thus makes it possible for the user to manipulate the customary fork or spoon with one hand without it being necessary or embarrassing to use some other expedient to assist in forcing the food on the utensil for use. The device moreover is extremely light in weight and of such material that it can be inconspicuously colored or even made translucent or transparent, thereby to blend into the color of the plate itself regardless of what color that part might be. Further still, by providing simple lines and junctions to the parts of the eating aid, the device can be readily washed by ordinary scrubbing or use of a dish cloth or, if need be, placed within an automatic washer with every expectation that the device will be thoroughly clean and dry after the washing operation is complete.

There has accordingly been shown and described herein a very simple but serviceable eating aid of versatile character, useful on a great variety of styles and sizes of saucers, bowls, dishes, etc., which is sanitary and inconspicuous and of material assistance under special circumstances to aid the manipulation of a fork or a spoon.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claim so as to embrace any and all equivalent devices.

Having described my invention, what I claim as new and desire to secure by Letters Patent is:

An eating aid for food retaining plates having flat central portions and sloping side portions of various breadths, said eating aid comprising a relatively thin sheet of plastic material forming a baffle adapted to stand substantially erect with a lower edge thereof on the flat central portion of said plate when in use and having a shallow depression intermediate opposite ends, a handle comprising a flat strip of said plastic material having an end edge secured to said baffle adjacent the mid-portion of the baffle, an upper portion of said handle having a length substantially greater than the breadth of said side portions adapted to extend outwardly beyond the edge of the respective side portion, a lower portion of said handle substantially parallel to the upper portion and joined to the upper portion at the outer end with a resilient intermediate portion, a surved portion on said lower portion at the inner end thereof extending toward said upper portion, a free end of said lower portion extending angularly away from the curved portion and the upper portion whereby to form a recess for application over the edge of the plate, said curved portion being adapted to engage the lower side of said plate, and a reinforcing bracket at the junction of said upper portion with said baffle extending from the handle along the adjacent wall of said baffle.

References Cited in the file of this patent

UNITED STATES PATENTS

| | | |
|---|---|---|
| 668,004 | Bergwitz | Feb. 12, 1901 |
| 704,139 | Stadelman | July 8, 1902 |
| 1,232,851 | Sayers | July 10, 1917 |
| 1,619,573 | Haines | Mar. 1, 1927 |
| 2,541,604 | Normandin | Feb. 12, 1951 |

FOREIGN PATENTS

| | | |
|---|---|---|
| 480,612 | France | June 6, 1916 |